United States Patent [19]
Coate et al.

[11] Patent Number: 5,679,257
[45] Date of Patent: Oct. 21, 1997

[54] INDUSTRIAL WASTE WATER TREATMENT

[75] Inventors: Robert B. Coate, Waco, Tex.; John T. Towles, P.O. Box 525, Waco, Tex. 76712

[73] Assignee: John T. Towles, Waco, Tex.

[21] Appl. No.: 525,956

[22] Filed: Sep. 8, 1995

Related U.S. Application Data

[62] Division of Ser. No. 223,584, Apr. 6, 1994, Pat. No. 5,466,367.

[51] Int. Cl.[6] .................. C02F 1/48; C02F 1/78; C02F 1/50; C02F 1/52
[52] U.S. Cl. .............. 210/695; 210/716; 210/724; 210/748; 210/758; 210/760; 210/764; 204/554; 204/557
[58] Field of Search ............... 210/748, 760, 210/724, 695, 758, 764, 716; 204/554, 557

[56] References Cited

U.S. PATENT DOCUMENTS

| | | | |
|---|---|---|---|
| 3,948,774 | 4/1976 | Lindman | 210/192 |
| 4,003,832 | 1/1977 | Henderson | 210/19 |
| 4,064,047 | 12/1977 | Bernreiter | 210/96 R |
| 4,076,617 | 2/1978 | Bybel et al. | 210/760 |
| 4,230,571 | 10/1980 | Dadd | 210/760 |
| 4,261,711 | 4/1981 | Vaseen | 55/100 |
| 4,687,574 | 8/1987 | Hellman | 210/151 |
| 4,752,401 | 6/1988 | Bodenstein | 210/746 |
| 4,857,204 | 8/1989 | Joklik | 210/695 |
| 4,872,959 | 10/1989 | Herbst et al. | 204/109 |
| 5,059,317 | 10/1991 | Marius et al. | 210/202 |
| 5,178,755 | 1/1993 | LaCrosse | 210/195.1 |
| 5,190,659 | 3/1993 | Wang et al. | 210/663 |

*Primary Examiner*—Neil McCarthy
*Attorney, Agent, or Firm*—Dennis T. Griggs

[57] ABSTRACT

A waste water treatment system is illustrated which can be configured to be portable and which minimizes the addition of solids to be disposed of through the use of ozone for contaminant reduction to basic elements after the pH value of the waste water to be treated is properly adjusted. This ozone in one stage is combined with ultrasound to cause coagulation and precipitation. In another stage, ozone and ultraviolet light are used in a reduction process. Ion alignment using a magnetic field and an electrochemical flocculation process to which the waste water is subjected causes further coagulation and precipitation. As designed, the system can operate continuously with redundancy at appropriate points so that removal of solids from the filtration units can occur simultaneous with the overall decontamination process.

14 Claims, 7 Drawing Sheets

INDUSTRIAL WASTE WATER TREATMENT

CROSS REFERENCE TO RELATED APPLICATION

This is a division of application Ser. No. 08/223,584, filed Apr. 6, 1994, now U.S. Pat. No. 5,466,367.

FIELD OF THE INVENTION

This invention is related generally to waste water treatment, and in particular to multiple stage treatment apparatus which may be configured for portable operation to accommodate on site removal of multiple contaminates, and is particularly adapted for use in emergency water clean-up situations.

BACKGROUND OF THE INVENTION

Many water pollution problems are being caused by improper disposal of chemicals and/or chemical compounds into ground water reservoirs, streams, lakes and rivers. It is highly desirable that treatment of these contaminated waters be accomplished without the addition of even more chemicals which may result in another form of pollutant or damage to the ecology.

When severe water pollution occurs, one option is to transport the contaminated waste water to an offsite authorized disposal facility. However, transportation of such waste water in most circumstances is prohibitively expensive due to the volumes involved. Furthermore, transportation of waste water deemed hazardous may require prior authorization and permits from regulatory authorities. Rural, residential and agri-business sources of waste water are particularly in need of effective treatment systems.

Since any waste water treatment system that adds chemicals such as chlorine, polyelectrolytes or other flocculates to kill organisms or remove metals and chemicals will necessarily require the production of such materials before use, it is ecologically desirable to provide a purification system which minimizes the requirement for any further manufacture of materials to be used in the treatment process.

The pollution problem posed by the disposal of waste water from domestic and industrial sewage is a serious problem, especially in densely populated areas. In such areas, literally millions of gallons of untreated or inadequately treated waste water from domestic and industrial sewage are discharged into streams, lakes and the like. The discharge of such inadequately treated waste water may cause severe health problems as well as being aesthetically undesirable. A variety of infectious microorganisms are found in municipal waste waters, which, if the water is not disinfected, can lead to outbreaks of gastroenteritis, salmonellosis, typhoid, ear infections and infectious hepatitis.

Chlorine has been traditionally employed for disinfecting water for domestic use and waste water. However, recent reports concerning the carcinogenic effects of chlorinated compounds resulting from chlorine disinfection have stimulated the search for less potentially harmful disinfectants. It has been found that the indiscriminate chlorination of waste waters results in the formation of halogenated compounds which are toxic to aquatic life and potentially toxic to humans. Further, chlorination can satisfy prospective federal water discharge standards only with such high dosages that expensive dechlorination of the treated water is required as a further treatment process step.

Another chemical used for disinfection is sulfur dioxide ($SO_2$). $SO_2$ has long been known to the food processing and wine industries for disinfection of equipment and beverages. Although $SO_2$ has accomplished the disinfection of waste water without the problem of generation of chlorinated carcinogenic compounds, the process has not achieved wide-spread use possibly because of the large quantities of $SO_2$ required for adequate disinfection.

Purification of polluted water for purposes of reuse, whether starting with agriculture/municipal sewage or with industrial waste, has been concerned primarily with recovery of potable water. Practically speaking, this can be done only after the initial separation and disposal of solid components in an inert state, this being considered a necessary and preliminary step for any subsequent treatment. The solids obtained may then be utilized to a small extent as landfill, but such product was not a primary purpose of the separation. For the most part, the undifferentiated sludge is simply separated in bulk and discarded in the manner most convenient. Purification of the aqueous phase then takes place (if at all) as a successive rather than a concurrent procedure. However, it will be realized that the aqueous run-off from many and probably most water treating procedures (even if only involving flushing) carries a quantity of solid and potentially solid ingredients having tangible economic value if such ingredients could only be recovered in concentrated form without great expense.

Although the discussion thus far has involved water being used for cleaning, whether in the home or in industry, or from run-off, where the introduction of contaminates are obvious, other less obvious forms of contamination are found in examples where a body of water is circulated as a coolant in many industrial chemical plants. Each time this water is returned to the heat exchanger, a part of the water is evaporated and the evaporation step tends to increase the concentration of contained solids merely by reducing the volume of the liquid. However, in the travel through the coolant system, the water typically picks up deposits or sediments from the plumbing system, and in addition, in order to minimize corrosion, foaming and scale formation, various inhibitory additives are mixed into the circulating stream. At some point, the dissolved solid content is built up to a maximum allowable level for continued circulation and it becomes necessary to discard at least part of the fluid mixture and replace it with fresh water. This heavily loaded discard is an illegal pollutant and must be purified before release into flowing streams or the ocean. It would be beneficial if the water could merely be periodically decontaminated and returned to the coolant circulation system.

DESCRIPTION OF THE PRIOR ART

Large municipalities have waste water treatment plants covering many acres. These facilities use varied and sometimes elaborate approaches to removing contaminates from the water before returning the water to the environment. The systems involved may use chlorine, sulphur dioxide, various chemical coagulants, settling ponds, ozone, ultraviolet light, magnetic and electrochemical flocculation techniques in various combinations to accomplish decontamination of the waste water. These processes do, of course, in most cases, include filters of various types between some of the various processes.

There have also been many attempts in the prior art to produce portable waste water treatment facilities using one or more of the above-mentioned techniques. However, these prior art portable units known to date have either been very limited in volume or have been severely restricted in the various types of contaminates that can be removed or in the efficiency of removal. By efficiency of removal, we mean not only the percentage of contaminates removed but additionally the cost of energy and chemicals required to cause such removal. Further, many of the prior art devices have not been designed in a manner to proficiently gather the removed contaminates in a form that can be efficiently reprocessed for recycling.

Although ozone has been used for treatment of drinking water as early as 1903, it has been under utilized as many people have considered its use only as a disinfectant and have failed to utilize ozone for its highly reactive oxidation qualities. In other words, the traditional use of ozone has been to kill bacteria, rather than to aid in the decomposition and/or removal of contaminates.

Ultraviolet or photolysis technologies have been used for years in the treatment of drinking water to remove bacteria and other water contaminates. However, only recently has it been determined that when ultraviolet light and ozone are combined, a rather "explosive" reaction occurs to create a highly reactive hydroxyl ion. The end result of this is that many compounds, that neither ultraviolet light or ozone can independently remove, may be removed by the combination of those technologies. The rate of removal is extremely rapid so that treatment time is reduced to a short time compatible with continuous flow system treatment schedules. Such prior art techniques have not been combined into an overall system of a type which could be made portable for site treatment of contaminated waters.

OBJECTS OF THE INVENTION

The principal object of the present invention is to provide a waste treatment system which can be operated in a portable configuration.

A related object of the present invention is to provide a waste treatment facility which can operate on a continuous, rather than a batch basis.

Another object of the present invention is to provide a waste treatment facility which can remove a wide range of contaminates from the waste water.

Yet another object of the present invention is the design of a waste water treatment system wherein the removed contaminates can be readily accessed for recycling of the various component parts.

Still another object of the present invention is to minimize the introduction of chemical agents into the water being treated.

Another object of the invention is to disclose an improved step in the treatment of contaminants prior to electrochemical flocculation for minimizing the adherence of any of said contaminants to the liquor contacting surfaces within the electrochemical flocculation unit.

Yet another object of the invention is to provide an improved ozonation treatment stage in an overall water treatment system.

Still another object of the present invention is to provide a system which is extremely versatile in operational interconnection and may be configured to bypass contaminate removal portions of the system that are not needed for a particular contaminate removal situation, thereby reducing energy and material costs.

Another object of the present invention is to provide a waste water treatment system which may be economically employed by small to medium users and which waste treatment system effectively eliminates objectionable quantities of contaminates from waste water such that system effluents may be freely disposed of or recycled.

SUMMARY OF THE INVENTION

The foregoing objects are achieved according to the present invention by first analyzing the waste water to be decontaminated to minimize the occurrence of any unnecessary waste removal processes. If there are solids in suspension in the waste water that are in excess of 80 microns in size, the liquor is first passed through a hydrocyclone having a dual bag filter connected to the underflow outlet. With a dual bag system, one bag can be cleaned while the unit continues in operation. The filtrate output of the dual bag filter and the overflow output from the hydrocyclone are then combined.

If there is an extreme volume of fines (i.e. fine material which was too small to be eliminated by the hydrocyclone stage) in the combined liquor, the liquor may be sent first to a belt press filter and then to a pH adjustment tank. However, typically the liquor is supplied from the hydrocyclone to a pH adjustment tank to change the pH of the waste water, if necessary, to a value which will allow optimum removal of contaminates. Typically, the pH value will be adjusted to the range of 6–10 with the typical value being 7 or 8 depending upon the initial analysis of contaminates to be removed. The pH adjustment is made in a tank having enough capacity to hold 8–10 minutes of the maximum flow capacity of the system.

To assure thorough mixing, waste water is input at the top and drawn out at the bottom while compressed air is continuously bubbled through the system from bottom to top. This action removes many VOC's (Volatile Organic Compounds) such as benzene in an oxidation process commonly referred to as stripping. Further, in a preferred embodiment, there is a mechanical mixer in the tank to even further circulate the waste waters. Since the pH adjustment often causes floc or foam to accumulate at the top of the tank, a skimmer is used to remove the floating material in addition to the sludge and exiting water at the bottom of the tank. Both of these streams of fluid are passed through a belt filter and clarifier (if such was not previously used) to remove solids generated during the pH adjustment phase. Valving is included to bypass the pH adjustment tank where the pH is already at an appropriate value and if there are either no VOC's or they can be satisfactorily be removed at a later stage. The liquor output of the filter clarifier is then ozonated (subjected to an injector of ozone or $O_3$ in a preferred embodiment) before being supplied to an ozonation treatment tank.

The ozonation treatment tank is sized to allow at least 10 full minutes of ozone exposure time. The tank is sized large enough to have room left over at the top to collect ozone (typically referred to as off gas) being emitted from the water in the tank being treated. This off-gas is recycled by venturi injection of same into a stream of water taken from near the bottom of the tank and reintroduced into the tank by a floating eductor or fluid injector which projects the reozonated liquor toward the bottom of the tank. In a preferred embodiment, ultrasound is also applied to the contents of the ozone treatment tank to increase the speed of reaction or in some cases to actually cause a reaction where the contaminate would be refractory to the ozone treatment alone. As floating solids are typically again formed, a skimmer is used to remove the solids from the surface of the water. The skimmer removed liquor is sent a second belt filter and clarifying stage of the type previously described. Ozone rich water is taken from the top of the tank and sent to an input at the top of a receiving reaction and buffer tank for allowing further ozone interaction before the fluid is removed at the bottom thereof for transmission to the second belt filter and clarifying stage receiving the skimmer output mentioned above.

In a preferred embodiment, a further flow balance buffer or holding tank is utilized to receive the output of the last mentioned belt filter and clarifying stage so that the liquor flow rate can be controlled to the following stages. If the water in this flow balance buffer tank is reasonably clear, (i.e. the turbidity is low), and there are contaminates such as cyanide complexes of metals or chlorinated organic compounds such as PCB's (polychlorinated biphenyls) that may require the combination of ultraviolet light and ozone to remove, the waste water is passed through an ultraviolet light stage after the ozonation. If such compounds are not present, or the turbidity is too high, the ultraviolet stage can be by-passed for the moment.

At this point, the previously contaminated water, in some situations, is of sufficient clarity to be returned to the environment. However, if the initial analysis shows that further treatment is required, it may be subjected to electrochemical flocculation. Electrochemical flocculation is the process of applying a direct or alternating electric current and voltage of varying strength to electrodes contacting water which process results in the formation of flock that can be filtered to remove suspended and flocked dissolved substances. The waste water is first subjected to ozonation and then to an intense magnetic field to cause dissolved substances such as silica and magnesium to remain in suspension instead of being absorbed into ions of the type which would cause adhesive scale deposits. Typically, the electrochemical flocculation process uses at least one sacrificial electrode in the treatment. In a preferred embodiment, four different electrochemical flocculation stages were used. Each stage causes flocculation of different contaminates. Valving is arranged such that certain stages can be by-passed if the analysis indicates given contaminates are not present. The output of the flocculation unit is filtered in a hydrocyclone unit, clarified, filtered, clarified again and bag filtered before being applied to the final filtration stages such as silica sand filter for polish. As is known in the chemical art, polish is the removal of the final traces of impurities.

If the waste water was not previously treated through the use of ultra-violet light and the analysis shows that such treatment is needed, it is then ozonated and treated with ultraviolet light. Before being applied to the remaining filters, the fluid is again subjected to an ozonation treatment. The ozone combined with biological (sometimes referred to as bacterial) activated granular charcoal (BAGC) is excellent for the removal of chlorine, insecticides, pesticides and many classes of toxic organics as well as for removing color and odor from the water. The final stage of filtration occurs in a combination activated granular charcoal and hydroxyapatite activated granular charcoal filter which has the ability to remove additional amounts of chlorine, THMs, and PCBs, as well as various metals and other materials. At this point, the water is typically drinkable and in any case is in a decontaminated format such that it can be returned to the environment such as a stream of water. This Water is completely usable (drinkable) by those downstream.

The system as outlined also includes the capability of backwashing the polish filters and removing the contaminates from the polish filters. This backwash can be accomplished while the system is operational due to the duplication of polish filters and the valving arrangement. The backwash liquor is returned to the pH adjusting tank (whether or not this tank is being actively used for pH adjustment) in a recirculation arrangement for removal of the contaminants by the various other filters. The overall system further includes the capability of generating electrical power required to be self-contained and also for generating the ozone directly from the air after drying and chilling same.

TECHNICAL ADVANTAGES OF THE INVENTION

The present invention provides contaminate removal without the addition of chemicals other than acid or base for the adjustment. Since no solid or liquid materials are inserted into the wastewater stream by this process that are active chemical flocculants, coagulants or polymers, the quantity of solids that must be disposed of as a result of the various filtrations is minimized. Further, the resulting solids, in the absence of added materials, are much more economically recycled than if additional chemicals needed to be removed.

The present system will remove, from most waste water, bacteria, viruses, mildew, mold, odor, objectionable taste, most metals and other inorganic materials, many organics including hydrocarbons, phenols, pesticides (particularly polychlorinated biphenyls (PCB)), dichlorodiphenyltrichloroethane (DDT), 2,4,6-trinitrotoluene (TNT-pink water) and others. Not only is the discharged, treated water typically potable, all sludge will normally be in non-toxic form. Since a majority of the sludge has been removed by a flocculation process from the water, it will be in non-leachable form to surface waters that are in the normal pH range of 5.5 to 8.5.

Operational features and advantages of the present invention will be understood by those skilled in the art upon reading the detailed description which follows with reference to the attached drawings.

DETAILED DESCRIPTION OF THE PREFERRED EMBODIMENT

Throughout the following description, like parts have been indicated in the specification and drawings with the same reference numerals where appropriate. The drawings are not necessarily to scale and the proportions of certain parts may have been exaggerated to better illustrate details of the present invention. Further, all the various control and monitoring lines as well as electrical supply lines were minimally detailed to improve clarity of presentation and understanding.

Figure 1:
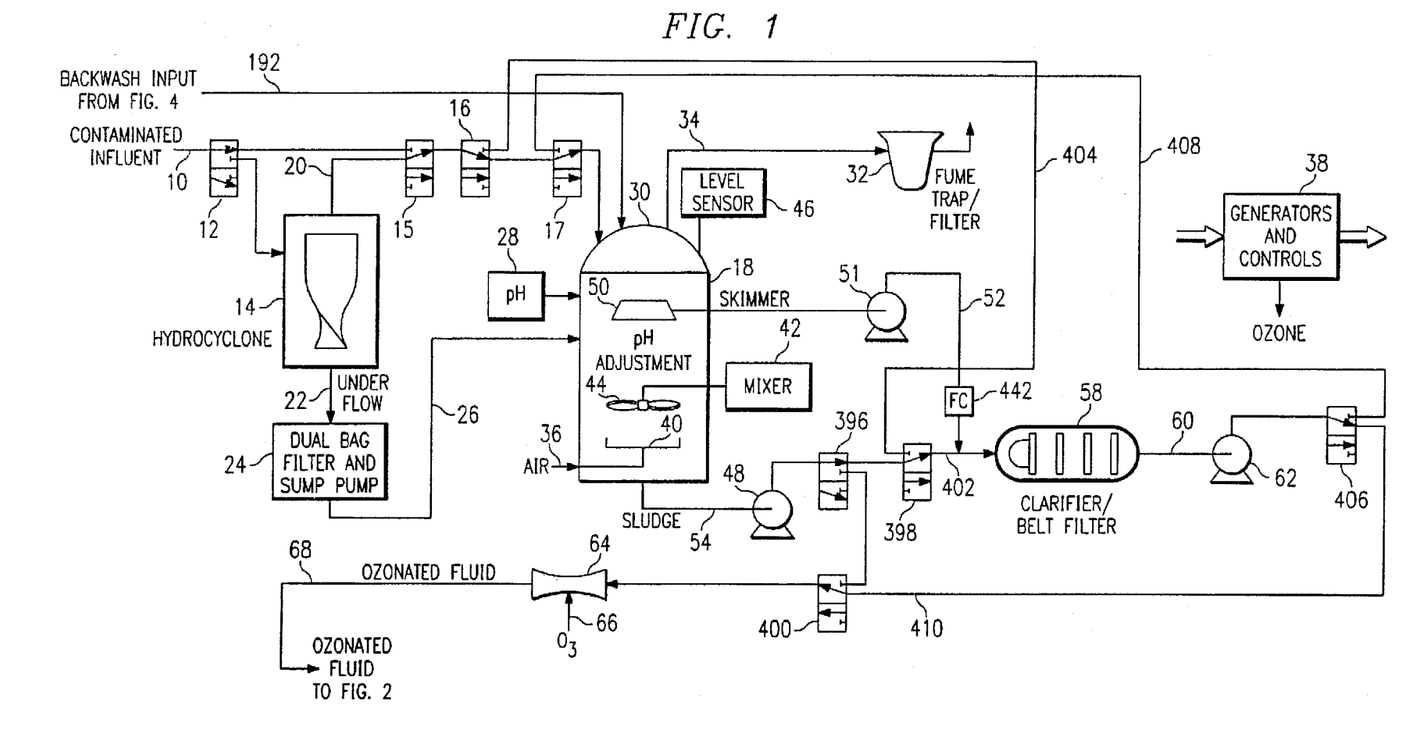
FIG. 1 is a block diagram illustrating the initial hydrocyclone, pH adjustment, filtration, ozonation phases of the system.

In FIG. 1, contaminated influent is received through a pipe or other conduit 10 and is supplied first to a three-way valve 12 which will either allow the influent to by-pass a hydrocyclone or other centrifuge type device 14 and thus pass through three three-way valves 15, 16 and 17 to a stainless steel pH adjustment tank 18 or instead be allowed to be filtered by hydrocyclone 14. This tank and others in the system are preferably stainless steel to minimize any further contamination of the liquor being decontaminated.

The output of the hydrocyclone 14 appears in two places. The first is the overflow output through a conduit 20 and the second is an underflow output 22. The conduit 20 provides a second input to three-way valve 15. The sludge and a small amount of waste water coming out of underflow output 22 is passed to a dual bag filter and sump pump 24 and then is supplied on through a conduit 26 to a further input of pH adjustment tank 18. The function of the hydrocyclone 14 and its' associated dual bag filter 24 is to catch and remove any solids in suspension in excess of 80 microns. Valving is included such that only one of the dual bags is on-line at any one time so that the off line filter can be serviced without interrupting the continuous operation of the decontamination process.

The pH adjustment tank 18 includes a pH detector and pH adjusting device 28. Device 28 includes means for maintaining the pH of the fluid within tank 18 at a set level through the addition of acid or base materials on a continuous basis. In a preferred embodiment of the invention, the device 28 includes dual peristaltic type pumps to add acid and/or base as required to adjust the pH. As may be noted, the tank 18 includes a cover 30 such that fumes, such as VOC's, generated or otherwise released during the pH adjustment are trapped by a fume trap filter device 32 connected to cover 30 via a conduit 34. Compressed air is supplied at a point near the bottom tank 18 via a conduit 36 and a compressed air diffuser 40. The air acts to accomplish stripping (the releasing of volatiles) from the liquor. The conduit 36 is connected, by means not shown, to a generator and control block 38.

It should be mentioned that the generator and control block 38 has many electrical, air, ozone and monitoring and control connections to various points in the system which, to simplify the drawings, are not specifically illustrated. Many of the more important connections are shown or are discussed. It is believed unnecessary, however, to illustrate all of the specific monitoring, control and electrical connections occurring.

A mixer block motor 42 is connected to a mechanical device such as a stirring or mixing blade 44 to keep the fluid within the pH tank 18 evenly blended. A level sensor 46 detects the level of water within tank 18 and when it reaches a given height will cause the activation of a pump 48. While this connection can be made directly, it will typically be made through a operator control panel or circuitry within block 38. In one embodiment of the invention, the level sensor for each tank provided indications of tank empty, ¼ full, ½ full, ¾ full and tank full. Such indications were provided at the control panel with LED's (light emitting diodes). When the pumps are switched to an AUTO condition, the supply side pumps are switched OFF when a tank receiving fluid is indicated as being FULL. The pump usually is not restarted until the tank level sensor provides an indication that the tank level has dropped below ½ full. The pumps are also switched OFF, when an indication is received from a tank supplying fluid to the pump, that the supplying tank is empty. Depending upon the specific tank and the contaminants being removed, the pump is typically turned ON when the supplying liquor thereto is either ½ or ¾ full. When the system is operated manually, similar switching of the pumps is practiced.

The adjustment of pH of the influent wastewater will typically produce floating flocculation solids and/or foam on the surface of the water. Thus, a skimmer, designated as 50, skims the surface of the fluid in the tank 18 to remove any solids floating thereon off the surface of the water and supplies the skimmed liquor through a pump 51 and a conduit 52, including a flow control valve 442, to an input of a clarifier/belt filter 58. Fluid is also supplied from the bottom of tank 18 through a conduit 54 to a pump 48. The fluid from conduit 54 typically will include suspended solids and sludge tending to accumulate on the bottom of the tank. The output of pump 48 is supplied to a three-way valve 396 which has outputs connected to inputs of three-way valves 398 and 400. A conduit 402 connects an output of three-way valve 398 to the flow control output of conduit 52 and thus to the input of filter 58. The three-way valve 16, which was previously mentioned as having an output connected to an input of valve 17, also has an output connected via a conduit 404 to a second input of three-way valve 398.

The clarifier/belt filter 58 may be of the type manufactured by CETCO (Colloid Environmental Technologies Company, 1500 W. Shure Drive, Arlington Heights, Ill. The preferred embodiment for filter 58 comprises a settling tank, a continuous stainless steel web belt drawing and conveying roll-type filter paper of the type and grade required for a specific situation under the discharge arrangement from the settling tank. The units supplied by CETCO are configured to receive fluid in an overhead sludge settling tank. The paper filter and endless mesh belt is located beneath a discharge point of the settling tank. The belt is designed to have a slight incline so as to keep the liquid in a sludge laydown area of the mechanism. A float is used to detect a liquid level increase due to media blinding (i.e. interference with the functioning of a screen mesh by a matting of fine materials during screening). When blinding is detected more paper filter media is advanced into the system.

Near the end of the belt there is located a pressure roller (not shown) to extract the remaining fluid from the sludge. At this point the resulting sludge typically has the consistency of putty. As the endless belt passes over the end roller, the sludge, along with the used filter paper, is dropped into a dump container for later disposal. The clear filtered water is caught in a retaining tank located below the belt filter. The clarifier portion of the unit 58 is typically large enough in design size to require at least 3–5 minutes to fill under the flow rates utilized in the process. The details of the filtering process of the purchased clarifier/belt filter are not shown in the drawings as they form no direct part of the present invention but were described for completeness. The fluid output by filter 58 is supplied on a line 60 to a pump 62. The output of pump 62 is connected to a three-way valve 406 which has one output connected via a conduit 408 to a second input of three-way valve 17.

The three-way valve 406 has a second output connected via a conduit 410 to a second input of valve 400. As will be apparent, with the valving as shown, the belt filter 58 can be used before or after the pH adjustment or can be bypassed entirely. The fluid is now passed from the output of three-way valve 400 to an input of an ozone injector 64. As illustrated, ozone injector 64 receives ozone on a line 66 from an ozone source within block 38. Ozonated water is output from ozone injector 64 on a line or conduit 68 to an ozone treatment tank 70 in FIG. 2.

Figure 2:
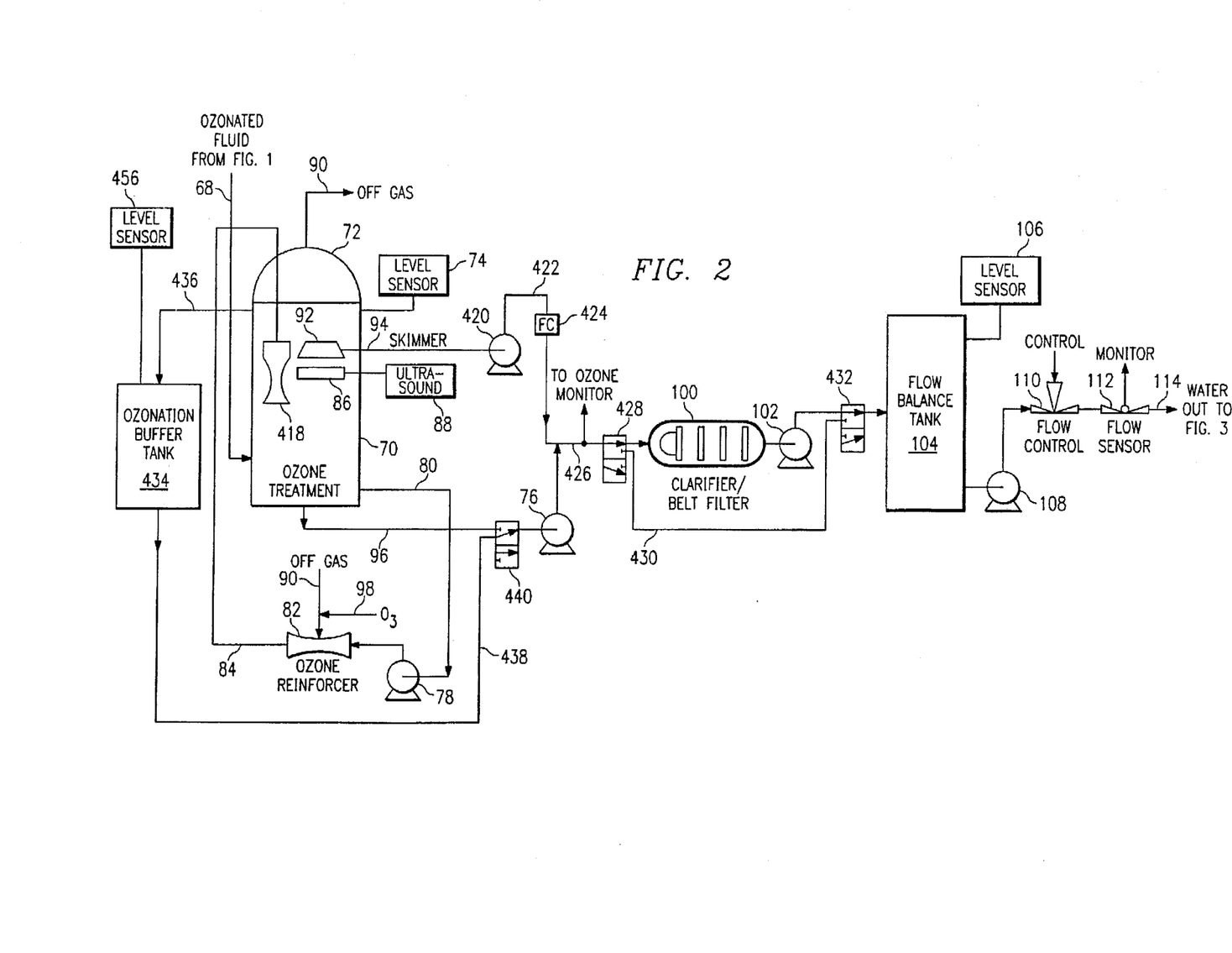
FIG. 2 is a block diagram illustrating the treatment of the liquor supplied by the components of FIG. 1 including the application of ultrasound and the method of recycling the resulting off gas by recirculating the bottommost liquor in the ozone reaction tank along with re-injecting ozone therein and then providing further filtration before outputting a flow controlled stream of partially decontaminated liquor.

In FIG. 2, the ozonated fluid supplied on line 68 (from FIG. 1) is input at a point about 1 foot from the bottom portion of tank 70 in one embodiment of the invention. Tank 70 will typically be a stainless steel container with a cover 72. A level sensor 74 keeps track of the level of fluid within tank 70 for the purpose of controlling the operation of at least pumps 76 and 78. The system is designed to operate such that there is always at least a 1 foot high reservoir at the top for off gas. Pump 78 receives fluids from a point about 1.5 feet from the bottom of tank 70 via a conduit 80 and supplies pressurized fluid to an ozone reinforcer venturi injector 82.

A fluid output from injector 82 is supplied on a conduit 84 to an eductor or fluid injector 418 utilizing a flexible conduit or hose arrangement for attachment to conduit 84. The eductor 418 floats on the surface of the water in tank 70. As ozonated water from conduit 84 passes through eductor 418, comparatively large amounts of additional water are drawn off the surface, combined with the incoming water previously pumped from the bottom of the tank and the resulting mixture is again directed toward the bottom of the tank with enough force to greatly contribute to the process of maintaining a uniform distribution of ozone within the tank 70. An ultrasound transducer or vibrator 86 operated by an ultrasound source block 88 is also located within tank 70.

An output of cover 72 comprises a conduit 90 for allowing the exit of off gases comprising primarily ozone emitted from the ozone laden water within tank 70. One of the recipients of this off gas is a venturi input of the ozone reinforcer venturi injector 82. The input to this injector 82 is also labeled 90. There may be times, especially at the beginning of the process, when there is insufficient off gas to properly ozonate the fluid passing through venturi injector 82. For this reason, the injector 82 also receives ozone on a line 98 from the control block 38 of FIG. 1.

A skimmer 92 is shown within the tank 70 to remove floating sediments on the surface of the liquid contained therein. The skimmer outputs surface fluid and contaminates via a conduit 94 to pump 420. Liquor output by pump 420 passes through a conduit 422, a flow control valve 424 and a conduit 426 to an input of a three way valve 428. Sludge, along with most solid and suspended contaminates, are supplied to a pump 76 via a bottom-mounted outlet conduit 96 and a three way valve 440. This path is normally used only for cleanup at shutdown time unless there is a large amount of sludge buildup at the bottom of tank 70 during a given decontamination process.

Normally the output of tank 70 is passed through a conduit 436 to the input of a buffer tank 434. When tank 434 is filled to the proper level, as indicated by a level sensor 456, sludge and water is drawn off the bottom of this tank and passed through the valve 440 to the input of the pump 76 and on to three way valve 428 via conduit 426. At this point the ozone level is monitored to make sure that the ozone treatment in the previous process was adequate.

Since there will be situations that filtering is not required at this point, the valve 428 serves as a bypass via a conduit 430 to a three way valve 432 around a clarifier/belt filter 100 and a pump 102. In one embodiment of the invention, the clarifer/belt filters as well as the polish filters were on a separate trailer from a trailer housing a majority of the rest of the tanks and bag filters. The interconnections between components on different trailers were accomplished by parking same side by side and using hoses and quick connect couplings therebetween. Thus the bypass, shown in the drawing as using valves 428 and 432 along with conduit 430, was actually accomplished using a short piece of detachable hosing.

In normal operation the fluid received by valve 428 is passed as shown to the second clarifier belt filter 100. Clarifier belt filter 100 may be substantially identical to previously referenced belt filter 58. After clarification and filtration, the fluid is supplied to the pump 102. Pump 102 supplies the output from unit 100 through the valve 432 to a buffer tank 104 having a level sensing device 106. The level of fluid within tank 104 is sensed by 106 for control of various motors including an output pump 108 connected to the bottom of buffer tank 104. The pressurized fluid output from pump 108 is passed through a flow control device 110 and then a flow sensor 112 before being supplied to a conduit 114. Flow control 110 receives input signals from block 38 via an unspecified control lead. Flow sensor 112 supplies a signal indicative of the volume of fluid passing therethrough to a monitor within control block 38 again via an unspecified signal lead.

Figure 3:
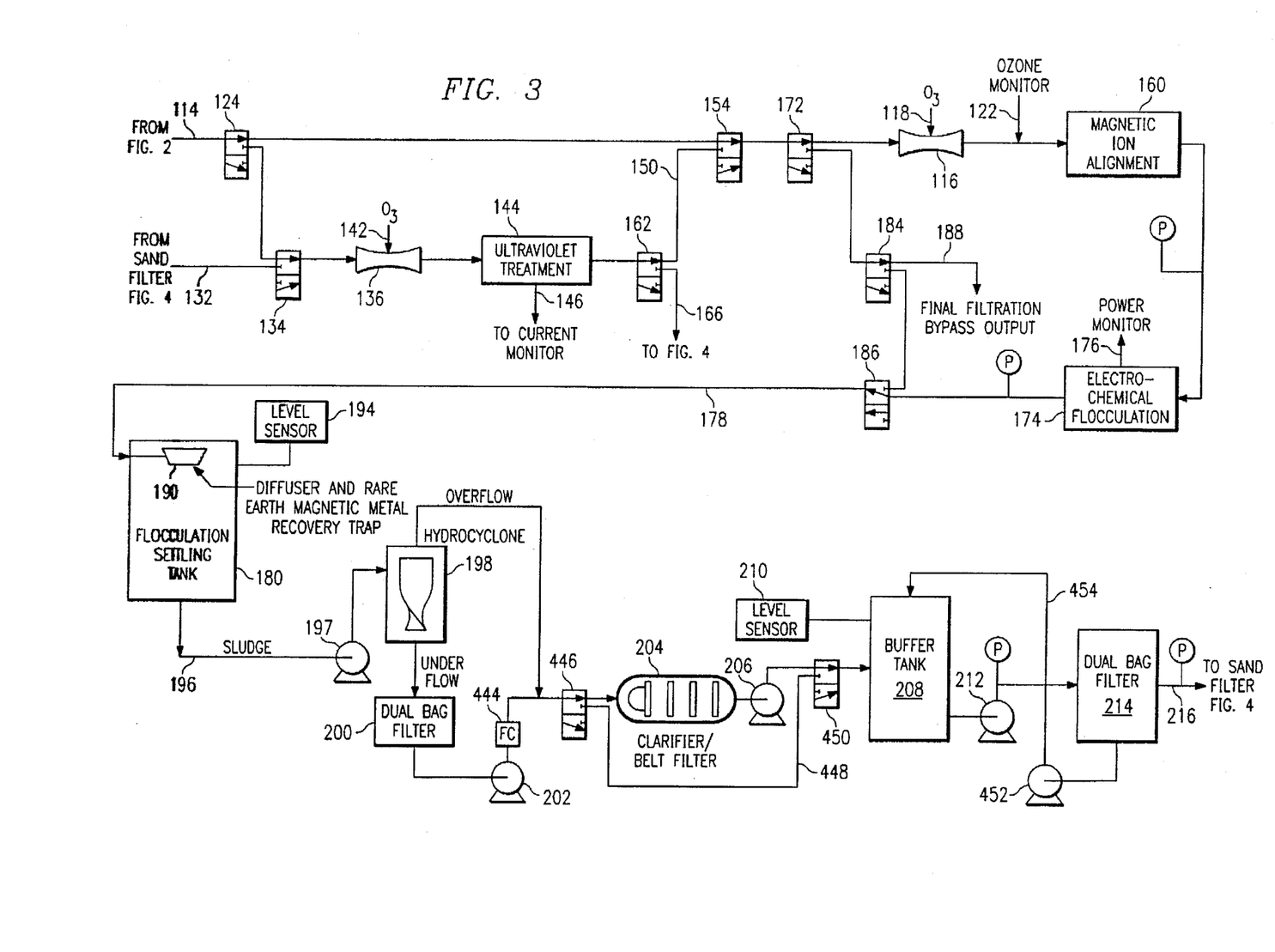
FIG. 3 is a block diagram continuation of the apparatus of FIG. 2 and shows the components for ozonating and ultraviolet treating the water from FIG. 2 before subjecting it to a magnetic field, electrochemical flocculation, magnetic metal recovery and further hydro-cyclone and belt filter filtering as well as bag filtering before exiting from FIG. 3.

FIG. 3 also shows conduit 114 (from FIG. 2) continuing to an input of a three-way valve 124. Valve 124 has outputs going to inputs of three-way valves 134 and 154. Valve 134 has a further input conduit labeled 132 as received from an output of FIG. 4. Valve 134 supplies fluid to an ozonation injector 136 receiving ozone input on conduit 142. Injector 136 supplies ozonated fluid to an ultraviolet light treatment block 144 having a current monitor output 146. After the fluid is subjected to ultraviolet light treatment, it is passed to an input of a three-way valve 162. Valve 162 has one output 166 returning to FIG. 4 and a second output connected to a further input of valve 154. The valves 124, 134, 154 and 162 allow the ultraviolet treatment to take place after the ozonation tank if the water is not turbid or later in the overall process if conditions require same.

Whether or not the ultraviolet treatment is pursued at this time, the output of valve 154 is supplied to an input of three-way valve 172 which has one output supplied as an input to an ozone injector 116 having an ozone input 118. Since the amount of ozone injected into injector 116 may well be under a different pressure than the ozone injected into injector 64, the input conduit is separately designated as was the ozone input for previously mentioned injectors 82 and 136. An output of injector 116 supplies fluid to a magnetic ion alignment block 160. The level of ozone of the fluid supplied to alignment block 160 is monitored in accordance with a lead 122. After the fluid is subjected to the high intensity magnetic field by block 160, it is passed to an electrochemical flocculation block 174.

In the preferred embodiment, the block 160 would comprise a large 10,000 gauss rare earth magnet mounted on a plastic pipe section for ionic shift of some materials such as calcium to avoid deposits within later receptacles such as the electrochemical flocculation unit 174. As previously mentioned, the construction of the electrochemical flocculation block may be of standard design. However, for maximum versatility, it may have multiple chambers and appropriate valving and bypasses. A preferred embodiment had four different passageways each having different numbers and/or types of electrodes for removing specific contaminants and valving to select only those chambers appropriate to a specific contaminate removal problem. Typically, at least one electrode in each passageway is sacrificial to the contaminants being removed. In the preferred embodiment, the electrochemical flocculation unit 174 receives a DC voltage of 24 volts by means not shown from the generator within block 38. One embodiment of the invention used dropping or bucking transformers and an associated diode rectifying network to supply the high current DC power required. The current used by the unit is observed and regulated by power monitoring devices within block 38 and is shown as an output lead 176 to a power monitor within control block 38 of FIG. 1.

A second output of three-way valve 172 is supplied to a three-way valve 184 which has a first output supplied to a further three-way valve 186 and a second output to a final filtration bypass output 188. In some instantances, the water will be clear enough after pH adjustment, ozonation and mechanical filtration to be returned to the environment without further treatment. Under such circumstances, output 188 and provides the final filtration by-pass output for the system if the waste water is such that it does not require flocculation or polish. In other cases, the valves 172, 184 and 186 may be used to bypass the flocculation treatment where appropriate. As will be observed, a second input of three-way valve 186 is received from the output of flocculation block 174. The output of valve 186 is a conduit 178 supplying fluid to a flocculation settling tank 180.

The conduit 178 supplying fluid to flocculation settling tank 180 is connected to a discharge pipe or diffuser located at the top of the tank 180. The water discharged into the tank is passed through a magnetic metal recovery trap 190 comprising a rare earth magnetic grid. A level sensor 194 is connected to the flocculation settling tank to provide an indication of fluid level in the tank and send signals back to the control unit 38 of FIG. 1.

Fluid is output from the bottom of flocculation settling tank 180 through a conduit 196 which is connected as an input to a pump 197 whose output is supplied as an input to a centrifuge or hydrocyclone unit 198. Hydrocyclone 198 may be substantially identical to hydrocyclone unit 14 except that hydrocyclone 198 is designed to remove solids larger than and down to 10 microns. The underflow is supplied to a dual bag filter 200 and the output of the dual bag filter 200 is supplied to a pump 202 having a flow control valve 444 connected to the output thereof.

The overflow output from the hydrocyclone 198 and the fluids passed by pump 202 are supplied as a common input to a bypass three way valve 446. Valve 446 has one output connected to a clarifier belt filter 204 which may be substantially identical in overall design to previous clarifier filters such as 58. The output of clarifier belt filter 204 is supplied to a pump 206 from which it is supplied to a further three way valve 450. A bypass conduit 448 connects the normally unused second output of valve 446 to a normally unused second input of valve 450. An output of valve 450 is connected to supply fluid to a buffer tank 208 having a level sensor 210 connected in a manner previously suggested.

The buffer tank 208 permits adjustments to be made in the flow of processes before and after the tank to permit continuous treatment of the incoming water. The water is output from tank 208 to a pump 212 and thence to a dual bag filter block 214. This filter was designed to catch any contaminates larger than 1 micron in one embodiment of the invention. A normal high fluid flow output of dual bag filter 214 is supplied on a conduit 216 to the sand filter portion of the final filtration devices in FIG. 4. To keep track of the amount of contaminants in the filter 214, pressure sensors (shown as a P within a circle and otherwise unlabeled) are located on either side of this filter. The pressure differential will increase as the filter being used gets dirtier and this information may be used as a guide for switching filter bags. Filtrate from the bags is returned by a sump pump 452 to an input of tank 208 for a further pass through the filter 214.

Figure 4:
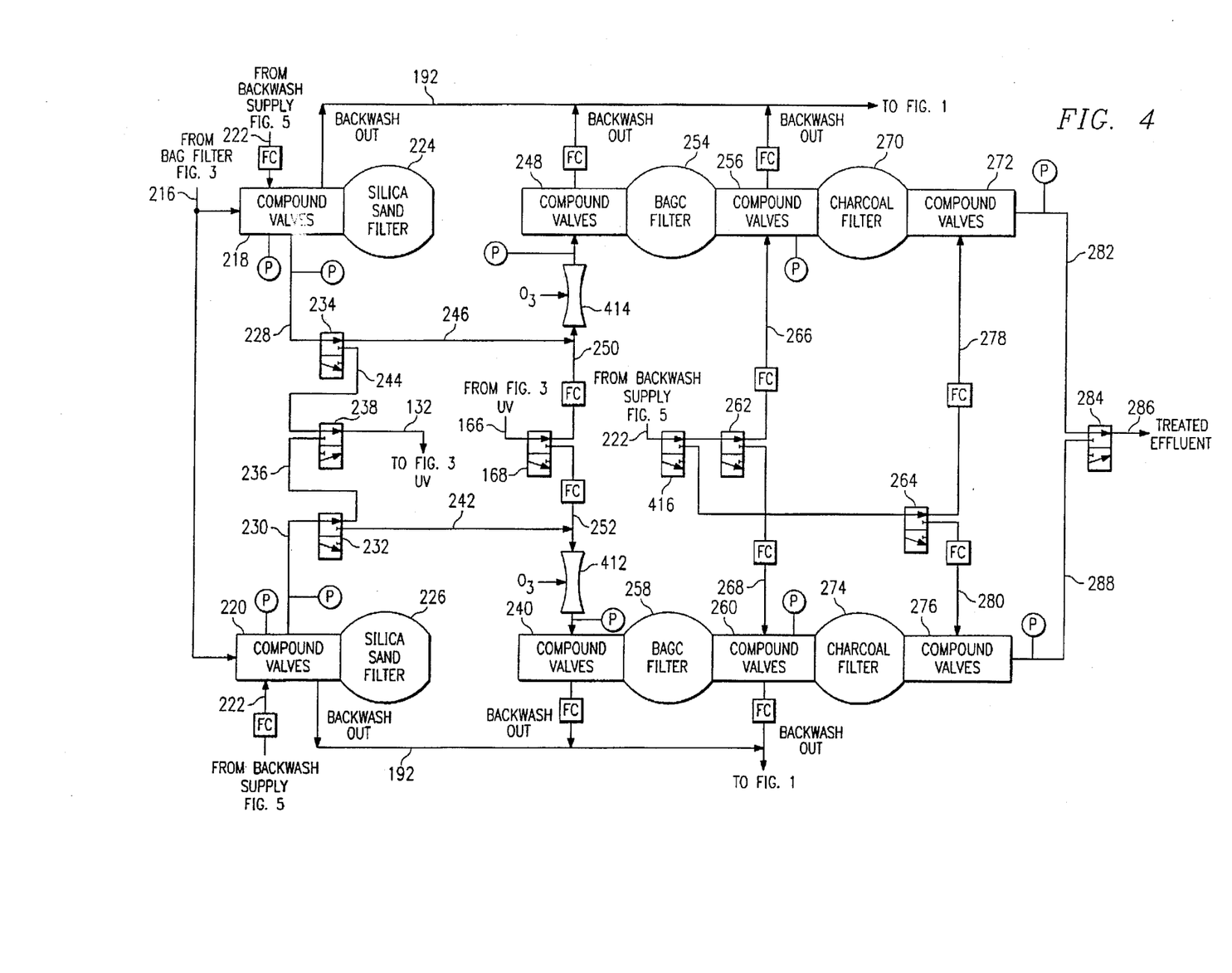
FIG. 4 continues the block diagram started in FIGS. 1, 2 and 3 and provides the polish filtering first by silica sand filters and then after further ozonation by BAGC and activated charcoal filters.
Figure 5:
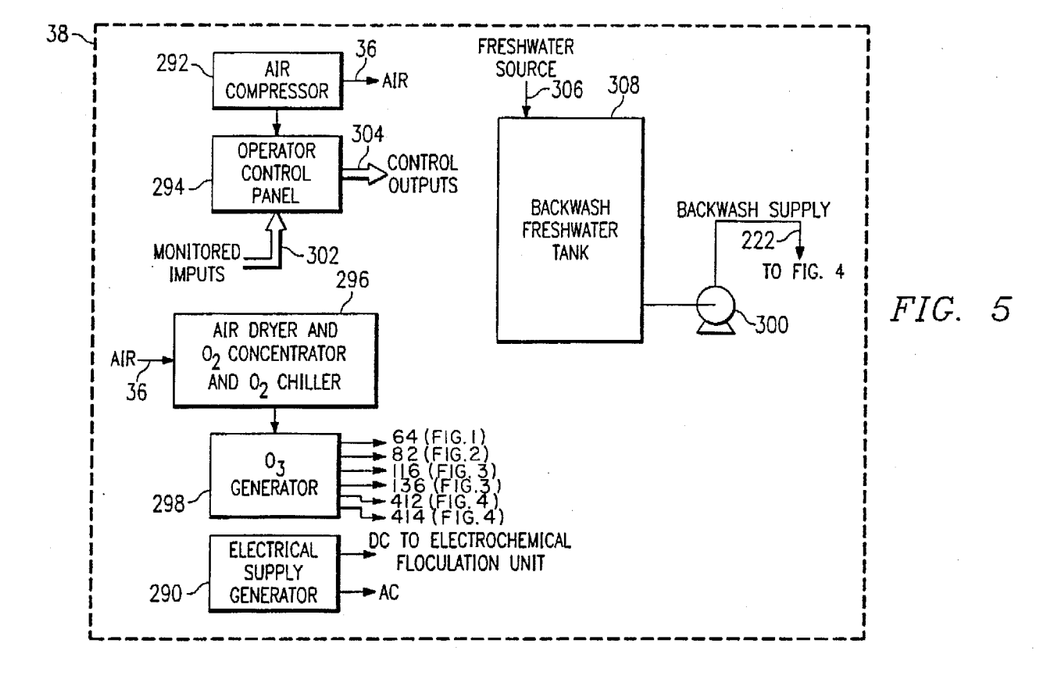
FIG. 5 is a block diagram showing the electrical, ozone and compressed air generators, as well as the monitoring and control signal output devices thereby illustrating in more detail block 38 in FIG. 1, along with blocks illustrating a fresh water tank for backwash.

Referring now to FIG. 4, it will be noted that the input line 216 from the bag filters 214 is connected to a pair of blocks 218, 220, each labeled compound valves. Each of these compound valve blocks 218, 220 have an input 222 from a backwash or fresh water supply as illustrated in FIG. 5. Compound valve 218 is interconnected to a silica sand filter 224. The compound valve 218 has a backwash output 192 as well as a sand filtered output conduit 228.

The valving within compound 218 may selectively supply fluid from line 216 to the normal input of sand filter 224 whereby it is supplied through its normal output to conduit 228. In the backwash mode, however, the fluid is supplied from conduit 222 (after it has passed through filter set selection valving not shown) through a flow control valve and the compound valve 218 and thus though the sand filter 224. The path of the backwash fluid through the sand filter is such that it flushes out the contaminates in filter 224 and supplies the fluid out through the back wash output port of the filter 224 and out to conduit 192. Pressure sensors are shown (but not numerically designated) for monitoring the pressure drop across the sand filter 224 to ascertain when the filter needs cleaning (backwashing).

Compound valve block 220 is substantially identical in action with compound valve block 218 and is connected to a further silica sand filter 226 whereby input on conduit 216 is normally output on conduit 230 after being passed through the filter 226 and the backwash is input and output on the same conduits as was the case for compound valve block 218. The line 230 is connected to a three-way valve 232 while the line 228 from compound valve block 218 is connected to a similar three-way valve 234. One output of three-way valve 232 is supplied on a conduit 236 to a three-way valve 238 while the other output of three-way valve 232 is supplied on a conduit 242 to an ozone injector block 412 (FIG. 4) which receives ozone from the generator 298 (FIG. 5).

The output of ozone injector block 412 is supplied as an input to a compound valve block 240. Three-way valve 234 is connected similarly with one output on a conduit 244 providing a second input to three-way valve 238 and another output on conduit 246 supplying fluid to a further ozone injector block labeled 414 receiving ozone on an undesignated input from the ozone generator in block 38. The output of ozone injector block 414 is supplied as an input to a compound valve block 248. The output conduit 132 of three-way valve 238 is the conduit 132 previously mentioned in FIG. 3 as an input from the sand filters.

After treatment of the fluid in ultra violet block 144 in FIG. 3, the fluid could optionally be output on conduit 166 from three-way valve 162. The conduit 166 is shown in FIG. 4 supplying an input to a three-way valve 168. Valve 168 has a first output passing though an undesignated flow control valve to a conduit 250 which combines with conduit 246 as a fluid input to ozone injector 414 for supplying liquids to a compound valve block 248. Alternately, the valve 168 could supply the input from ultraviolet block 144 through a flow control valve and a conduit 252 to injector 412 and on to compound valve block 240.

A BAGC (biological activated granular charcoal) filter 254 is located between compound valve block 248 and a compound valve block 256. A similar BAGC filter 258 is located between compound valve block 240 and a compound valve block 260. The backwash supply 222, previously referenced, is also supplied to a three-way valve 416 which has outputs to either of three-way valves 262 or 264. Three-way valve 262 is connected via a flow control valve and conduit 266 to compound valve block 256 and via a further flow control valve and conduit 268 to compound valve block 260. The compound valves within block 256 are not only connected to BAGC filter 254, but also connected to a charcoal filter 270 containing, in one embodiment, a 50%/50% mixture of activated granular charcoal and hydroxyapatite granular charcoal (sometimes referred to as bone charcoal).

A compound valve block 272 is also connected to charcoal filter 270. It should be noted at this point that each of the compound valve blocks 240, 248, 256, and 260 have backwash outputs 192 in a manner similar to that of compound valve blocks 218, 220. A charcoal filter 274, similar to unit 270, is also connected to a further compound valve block 276 as well as to compound valves in block 260. The three-way valve 264 supplies fluid either through a flow control valve on a conduit 278 to compound valve block 272 or through a flow control valve on a conduit 280 to compound valves in block 276. An output of compound valve block 272 is supplied on a conduit 282 to a three-way valve 284 which has a treated effluent output conduit 286. A second input to three-way valve 284 is supplied on a conduit 288 from compound valves in block 276.

The compound valves connected to the charcoal and BAGC filters 254, 258, 270 and 274 are similar in complexity to those in block 218. In normal operation, either the filters in the upper-half of FIG. 3 are being actively used, or the lower-half but not both simultaneously. At times, one set of filters will be used for filtering incoming contaminated water while at least one unit of the other set of filters is being simultaneously backwashed. As shown, the water from sand filter 224 is passed through an ozone injector before being filtered by filter 254 and passed through compound valve block 256 to charcoal filter 270 and then output on line 282 and ultimately on 286 as completely polished and potable water. The ozone input prior to the charcoal filter stages helps keep the charcoal biologically activated.

When backwashing occurs through these same filters, the backwash is supplied on either conduits 266 or 278 such that water from 222 passes in a backwards direction through the normal output of filter 254 and out through compound valve block 248 and a flow control valve to backwash output 192. The backwash supply of conduit 278 is passed through compound valves 272 and into the normal output of filter 270 and then out through compound valve block 256 and a flow control valve to backwash output 192. In other words, the contaminated backwashing fluid from filter 270 is not passed through filter 254, but rather is directly output to conduit 192. The various flow control valve blocks labeled FC could be omitted in most cases if proper valving procedures were always followed but are shown and used to minimize the possibility of accidental and unintended contamination of cleaned water or parts in the system.

Proceeding to FIG. 5, it will be noted that there is an electrical supply generator 290 which provides all AC requirements including power to the previously mentioned DC rectifier required for the electrochemical flocculation unit. While any source of AC supply would suffice, the present unit is intended to be portable and thus provision needs to be made for being self-contained. The AC power is also supplied within FIG. 5 to an air compressor 292, an operator control panel 294, an air dryer and oxygen concentrator and chiller 296, as well as to an ozone generator 298 and a pump 300. The air compressor 292 supplies air to the air dryer 296 and the operator control panel 294 as well as to other parts of the system such as to the pH adjustment tank 18.

The operator control panel receives a large plurality of monitored inputs on a set of lines designated as 302 and supplies a large number of control outputs on a line designated as 304. The lines 302, 304 are not individually designated within the remaining drawings as such numbering would unduly complicate the drawings. While the three-way valves are shown in a mechanically operated format, the operator control panel can electrically actuate many of the valves in the system whether they be three-way, open and closed, or the compound valves of FIG. 3. Typically, the operator control panel also operates the various pumps in response to signals from the various level sensors.

As previously indicated, the ozone generator 298 may supply various amounts of ozone to the devices requiring same and these outputs are again not individually numbered. Further shown within FIG. 5 is a fresh water source conduit labeled 306 supplying fresh water to a back wash or fresh water tank 308 having an output connected through a pump 300 to backwash supply 222. The apparatus of FIG. 5 is shown in a dash line 38 to indicate that all of these components comprise part of block 38 of FIG. 1. As previously mentioned, one embodiment of the invention employs two trailers to house all the parts in FIGS. 1 to 4. Thus the components of FIG. 5 are partially on one trailer and the remainder on the other.

Figure 6:
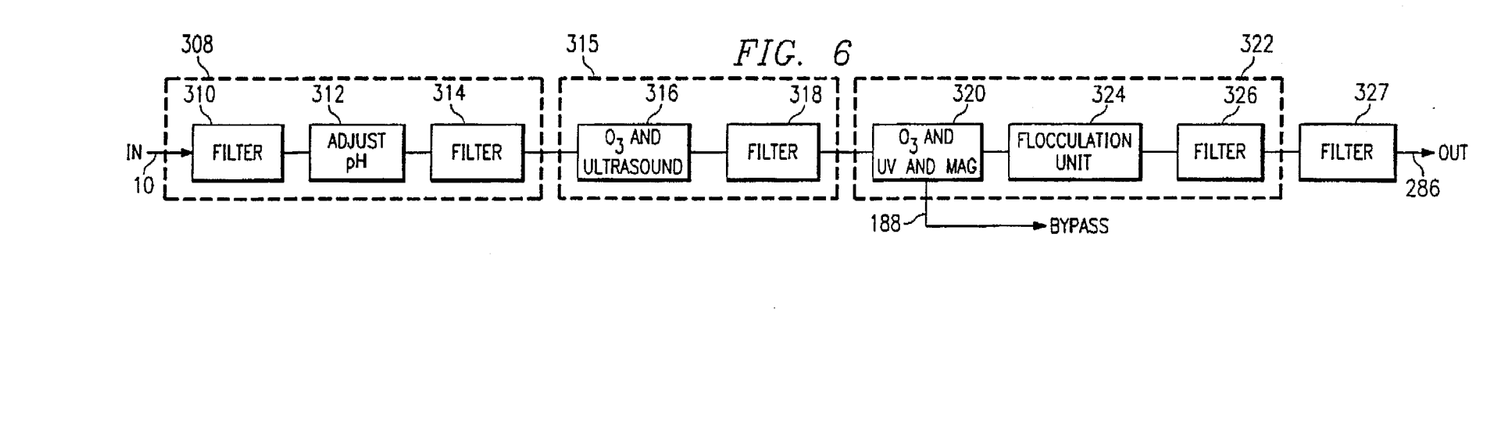
FIG. 6 is a generalized block diagram of the total filtration system presented in FIGS. 1–4.

In FIG. 6, a dash line block 308 represents the contaminate removal actions of the contents of FIG. 1 as relates to the overall inventive concept. Block 308 receives the contaminated influent on conduit 10. This influent may be filtered in a filter 310 and then adjusted as to pH in a block 312 after which filtration again occurs in a block 314. After filtration in block 314, the fluid is passed to the components of FIG. 2 as represented by dash line block 315 where the fluid is ozonated and ultrasound is applied in block 316. The liquid is again filtered to remove the solids produced by ozone and ultrasound. The further filtration occurs in a block 318. The output of filter 318 is supplied to an $O_3$ plus ultraviolet plus magnetic ion alignment block 320 within a dash line block 322 representing the contents of FIG. 3. Block 320 supplies both the partially treated by-pass output 188 and an output to a flocculation unit 324 and then to filter blocks 326 and 327 before being output as the treated effluent output 286. Block 326 represents the filtering taking place in the bottom portion of FIG. 3 while block 327 represents the polish filtering of FIG. 4.

Figure 7:
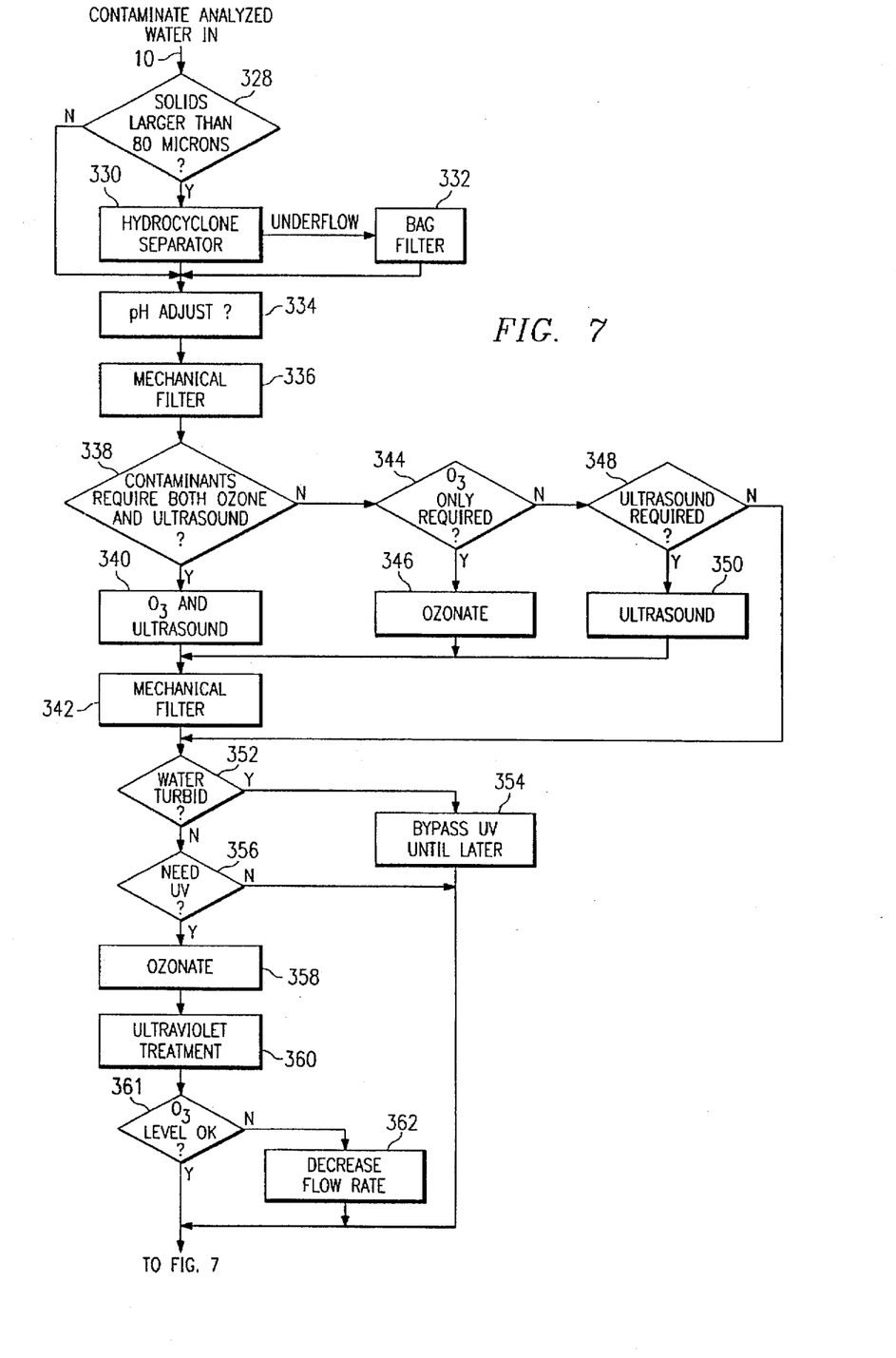
FIG. 7 presents a first portion of a flow diagram illustrating the steps used in the consolidated contaminate removal process of FIG. 6.
Figure 8:
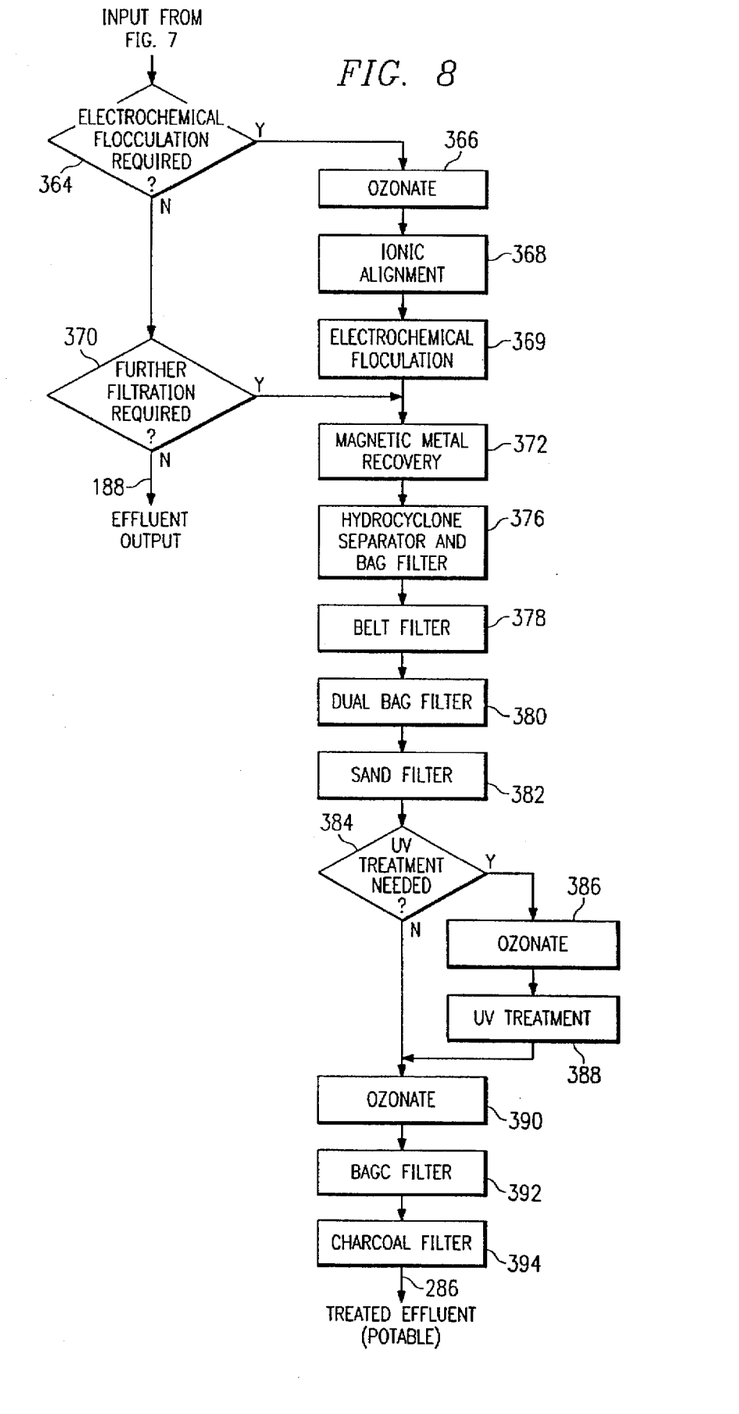
FIG. 8 presents the remaining steps of the process as commenced in FIG. 7.

FIGS. 7 and 8 provide a flow diagram of the operation of the system shown in FIGS. 1–4 and as consolidated in FIG. 6. Some of the major decision making processes are shown where attempts are being made to minimize equipment usage and maximize the volume of decontaminated output fluid obtained. As indicated, water which has been contaminate analyzed is input and if the analysis shows that there are not solids suspended therein that are larger than 80 microns, a decision block 328 will by-pass a hydrocyclone separator stage indicated as 330 with its attendant bag filtering operation indicated as block 332. In either event, the fluid is then pH adjusted, if appropriate, as illustrated in block 334. Typically, an adjustment of pH of the contaminated fluid will cause solids to form either on the surface of the fluid or be suspended therein and these will be removed by the clarifier and belt filter process shown as mechanical filter block 336.

At this time, a decision is made in accordance with the previously indicated analysis of contaminates as to whether or not the removal of contaminates requires both ozone and ultrasound. If it requires both, it proceeds to block 340 to cause the formation of further solids which are removed by a mechanical filter indicated as block 342. If only ozone is required to remove the contaminates, a decision is made in block 344 to proceed to ozonate in block 346 and again proceed to filtration in block 342.

If ozone is not required, a decision is made in a further decision block 348 whether or not ultrasound only is required and if so, the contaminate-laden fluid is subjected to ultrasound in a block 350. Otherwise, the entire ozone and ultrasound container is effectively by-passed by allowing fluid to pass through the container untreated, as well as bypassing mechanical filtration in 342 since no further contaminates would have been introduced subsequent to the last mechanical filtration process. Thus, the output of either mechanical filter 342 or the decision block 348 terminates in a decision block 352 where the turbidity of the water is ascertained.

Whether or not the contaminates require both ozone and ultraviolet treatment to remove the contaminates as initially analyzed, this portion of the process may have to be completed in a later portion of the overall process if the water has a turbidity of greater than a given value. If the water is too turbid, the process proceeds to block 354 and to the first decision block in FIG. 8. If a decision is made in block 352 that the water has a low enough turbidity and the decision is made in block 356 that ultraviolet treatment is required, the fluid is ozonated as shown by a block 358 and then subjected to ultraviolet light in block 360. The ozone level is checked in a decision block 361. If the ozone level is adequate, it proceeds to FIG. 7. If it is inadequate, the flow rate is decreased (or the ozonation occurring in step 358 is in some other way modified) to raise the $O_3$ level as indicated by block 362.

The input (from FIG. 7) as shown in FIG. 8 is processed in a decision block 364 to determine whether or not flocculation is required to remove contaminates as determined in the original analysis. If so, the fluid is ozonated in block 366, subjected to a magnetic field in block 368 and then passed through any appropriate stages of the electrochemical flocculation unit in block 369 before arriving at a magnetic metal recovery block 372. As shown, if the decision in block 364 was that no flocculation was required, the process would have directly proceeded to block 370.

In decision block 370, a determination is made, based primarily on the original analysis, as to whether the particular contaminate removal process requires any further filtration. If the fluid is to be returned to a settling pond, the filtration already provided may be entirely adequate and the effluent may be output as shown by lead 188. If, on the other hand, it is to be returned to streams or especially if the water is to be placed in potable condition for direct human consumption, typically further filtration is required and it is passed to the magnetic metal recovery block 372. The magnetic metal recovery of block 372 also allows settling before being passed to a hydrocyclone separator and bag filter as shown in block 376, a belt filter block 378 and another dual bag filter block 380 before arriving at a sand filter 382.

After sand filtering, a decision is made in decision block 384 as to whether or not ultraviolet treatment is now needed. If it was previously needed and was not used because of high turbidity, the system proceeds to the ozonation block 386 before ultraviolet treatment in block 388 and then further ozonation in block 390. If ultraviolet treatment is not needed at this stage, the process proceeds directly from decision block 384 to the ozonation block 390. After ozonation in block 390, the fluid is passed through a BAGC filter in accordance with block 392 and a charcoal filter per block 394. The output of charcoal filter 394 for substantially all possible original contaminates is now potable drinking water.

When ozone is used for disinfection, it has been found to be over 3,000 times as fast as chlorine and ozone does not produce the carcinogenic trihalomethane (THM) products, such as chloroform and bromoform, that are formed by the halogen elements. Further, the presence of ozone will extend the life of the activated granular charcoal filter media such as found in filters 254 and 258 of FIG. 3 and thus extend the times between replacing same. This is part of the reason for again ozonating the fluid immediately before it is filtered by these filters in this process.

Among the metals which are removed in the ozonation treatment tank 70 by the ozone are aluminum, arsenic, cadmium, chromium, cobalt, copper, iron, lead, manganese, nickel, and zinc. Each of these contaminates are removed to a level such that only 0.5% of the original concentration remains in the treated output. Although mercury as an element is only somewhat reduced by ozone treatment, aqueous solutions of dimethyl mercury are removed such that it can no longer be detected. The following compounds listed in Table I are also removed to a greater or lesser extent by ozone. However, all of the following compounds are substantially removed by either ozone combined with ultrasound, or ozone combined with ultraviolet:

TABLE I

| | | |
|---|---|---|
| Acetic Acid | Acetone | n-Butyl Acetate |
| Butoxyethanol | Cetyl Alcohol | Formaldehyde |
| Isopropyl Alcohol | Glycerol | Methacrylic Acid |
| Propylene Glycol | Resorcinol | Styrene |
| Methyl-Ethyl Ketone | Benzyl Alcohol | Toluene |
| n-Butyl Phthalate Camphor | Butane | Isobutane |
| Para-Phenylenediamine | Propane | Mineral Spirits |
| Trecresyl Phosphate | Striven | Ammonia |
| Liquefied Petroleum Gas | Xylene | Methyl Chloroform |
| Methylene Chloride | Trichloroethylene | Amino Phenol |
| Perchloroethylene | Hydrogen Cyanide | Benzene |
| Ammonium Persulfate | Phenacetin | Ammonium Hydroxide |
| Ethanolamine | Alkylated Silicates | Non-Ionic Detergents |
| Ethylene Tetracetic Acid (EDTA) | | |

As may be observed from the drawing of FIG. 2, and referenced in the detailed description, the ozone treatment tank 70 is stainless steel and not only is ozone injected into the fluid arriving at the tank, but a high ozone concentration is maintained in the fluid by taking the ozone emitted from the surface of the liquid contained in tank 70 as "off gas", and reintroducing this off gas back into the fluid through the combination of pump 78 and the venturi injector 82 which draws water off the bottom of the tank and re-introduces it to a point directed back toward the bottom of the tank through the use of the floating eductor 418. The venturi action of injector 82 will draw the ozone off of the top portion 72 of the ozone treatment tank 70. The ozone is under slight pressure due to the containment and this slight pressure also helps the introduction of ozone into venturi 82. When the off gas is of insufficient pressure, such as at start up, the connection of 98 from the on board ozone source within block 38 assures proper operation.

The magnetic ion alignment block 160 in a preferred embodiment of the invention comprises a 10,000 gauss rare earth magnet mounted on the outside of a section of schedule 80 PVC pipe. In this manner, there is no metal, other than the metal that may be in the flow stream itself, exposed to the magnetic field. Since the magnet itself is not in the flow stream, there is no gathering point to accumulate a magnetic build-up. The magnetic field does not remove anything from the water stream. Rather, the magnetic field induced into the water stream causes dissolved substances (both organic and inorganic) such as silica, magnesium, calcium, zinc, etc. to remain in suspension (sometimes referred to as becoming non-adhesive) instead of becoming absorbed into ions or adhesive scale deposits. The resulting internal change of these ions allows the water to release its insoluble properties to a more compact dense mass of the dissolved substances.

The scale forming masses are no longer collected and since they are now non-adhesive, pass through the electrochemical flocculation unit 174 without attaching themselves to the metal surfaces therein. With the magnetic elimination of the adhesive characteristics of these masses, scale build-up is eliminated within the electrochemical flocculation unit 174 so as to minimize any down time required to clear plugged annular flow spaces. An additional benefit of the magnetic ion alignment is that the electrochemical flocculation unit produces a denser and heavier flock for more efficient coagulation and separation from the water stream output in the filters or separators 198, 204, 214.

It may be noted that there is some duplication of treatment. In other words, some of the compounds or metals are removed at more than one stage in the filtration process. If all of the processes are used, the percentage of contaminates removed is extremely high. However, in many instances, one or more of the sections of the entire treatment process can be by-passed since with a good initial analysis, it will be realized that the contaminates will be adequately removed by other stages. For this reason, many of the treatment sections in this overall system are designed to be by-passed for a specific contaminate removal situation.

Three clarifier and belt filters are shown as part of the entire system and comprise units 58, 100 and 204. Each of these in one embodiment of the invention was substantially identical. It will be apparent to those skilled in the art that all three clarifiers and belt filters need to be used only when the percentage of contamination is high. If the contamination is somewhat less, one or more of these filters can be by-passed through the use of valves or bypass hoses.

The design of the belt press filter units 58, 100 and 204 includes an overhead sludge settling tank. Below this settling tank is an endless mesh stainless steel belt which carries a paper filter media as the belt advances. It is designed such as to climb a slight incline as the belt and paper advance, thus keeping the liquid in the sludge laydown area. There is located a float at this point so that as liquid levels increase due to media blinding, there is an automatic advance of fresh paper filter media into the system. As the belt and filter paper climb out at the far end, they pass under a press roller which extracts any final water from the sludge on the paper filter. The resulting sludge has the consistency of putty. As the endless belt passes over the end roller, the sludge drops off into a dump container for disposal along with the fouled filter paper. The clear filtered water is caught in a tank which is located below the belt filter. From this tank, the liquor may be directed back into the treatment process as is required.

The final filtration provided by dual bag filter 214 along with the filters in FIG. 4 is typically considered polish filtration. The dual bag filter 214 is used as a safety net for any contaminates of larger than one micron which may have slipped through previous filters. The remaining polish filters comprise each of two sets containing a silica sand filter, a biological activated charcoal filter and a 50/50 divided activated granular charcoal and hydroxyapatite granular charcoal filter.

The silica sand filters such as 224 will remove any of the extremely fine solids that were not retained in the belt press filters but which could cause bridging of the granular charcoal filters. As the treated stream leaves the silica sand filter on its way to the charcoal filter, it passes through an ozone venturi injector such as 414. The additional input of ozone at this point assures the maintenance of the biological condition of the BAGC filter 254 and also the constant rejuvenation effects of ozone are beneficial to both of the final charcoal filters 254 and 270.

The biological activated granular charcoal filters such as 254 are excellent for the removal of chlorine, insecticides, pesticides and generally classes of toxic organics as well as being very useful for removing color and odor from the water.

The activated granular charcoal, plus hydroxyapatite activated granular charcoal filters such as 270 have the ability to remove from the water chlorine, THMs, PCBs and additionally to reduce or remove amounts of fluoride, lead, cadmium, aluminum, iron, manganese, copper, mercury, strontium, arsenic and sulphur dioxide. The hydroxyapatite charcoal will tend to adsorb (retain by the process of surface coating of the charcoal particles) heavy metal or toxic minerals from the water.

Although the treated effluent flow output at 286 may contain residual dissolved ozone, this will quickly dissipate in the environment. Otherwise, the output flow meets all the Environmental Protection Agency (EPA) standards for metal, organics, bacterial and other contaminates, as well as color and odor.

As will be apparent from the description thus far, flow rates, filter pressure differentials and ozone rate of application are monitored and controlled by the apparatus in FIG. 5 as is the pH level, effectiveness of ultraviolet treatment and the power used by the electrochemical flocculation unit. The system as drawn and described is shown to be controlled mostly manually, but can readily be automated where desired or required.

In summary, as shown in FIG. 6, the influent waste water is filtered by block 310 in the form of hydrocyclone 14 of FIG. 1 if there are any suspended solids that are believed to be greater than 80 microns in size. Whether or not filtered, the pH value of the fluid is checked against what would be optimum for the removal of the contaminates involved. As will be realized by those skilled in the art, some materials such as cobalt and chromium are better removed at a higher than normal pH value such as 9. Zinc removal is best at a pH of 10. On the other hand, other contaminates such as nickel are better removed at a pH value of 6.

After the pH is adjusted to a value optimum for the contaminates involved in the pH adjustment tank 18, the output is filtered as shown by block 314 in a belt filter such as 58 of FIG. 1. After filtration, the waste water is subjected to ozone and/or ultrasound as shown by block 316 in the ozone treatment container 70 of FIG. 1. After the ozone and ultrasound treatment, it is again filtered to remove solids formed by the ozone treatment. The filter involved in this case would be the belt filter 100 of FIG. 2. The waste water is again treated with ozone and if the contaminates warrant same, by ultraviolet light as shown by block 320 if the turbidity is low enough to utilize ultraviolet light at this point. Otherwise, the ultraviolet light treatment is performed later in the process as outlined in the flow diagram of FIGS. 7 and 8.

By the time it is treated by pH adjustment, ozone, ultrasound, and ultraviolet light, the fluid will have enough contaminates removed in some instances that it is ready to be returned to the environment. If there are contaminants involved which require further filtration, it will then be subjected to ozone, a magnetic field and then supplied to an electrochemical flocculation unit 324, if appropriate, and finally to the polish filters 326 and 327. Once it is output by the polish filters, including optionally ultraviolet treatment where the water was originally too turbid, the output water 286 is typically potable.

While we have attempted to illustrate a preferred embodiment of the inventive concept incorporating ozone as the primary treatment element either by itself or in conjunction with pH adjustments, ultraviolet light and ultrasound, as well as electrochemical flocculation, we wish to be limited not by the specific embodiment illustrated, but only by the scope of the appended claims.

What is claimed is:

1. The method of treating wastewater for reclamation thereof comprising the steps of:

filtering contaminated influent water to produce an overflow first stream of water and an underflow second stream of water;

filtering the underflow second stream to remove solids while outputting the remaining liquor as a third stream of water;

adjusting the pH of the combination of said first and third streams of water while aerating the same with air within a staging tank;

skimming floc from the surface water of the staging tank while simultaneously draining water from the bottom of the staging tank to produce a fourth stream of water which as a result of the pH adjustment and aeration may include first further precipitates;

filtering the fourth stream of water to remove any first further precipitates and outputting a fifth stream of water;

ozonating said fifth stream of water within a closed container for a period of time sufficient to kill living organisms and precipitate second further solids, the closed container providing ozone as an outgassing output from the incoming fifth stream of water for further water treatment and providing a sixth stream of water as a further output; and filtering the sixth stream of water to remove any second further precipitates and outputting a seventh stream of water.

2. The method of claim 1 comprising the additional steps of:

ozonating said seventh stream of water; and
    treating said seventh stream of water with ultra violet light.

3. The method of claim 1 comprising the additional steps of:

ozonating said seventh stream of water;

conducting the seventh stream of water through a magnetic field having a field intensity sufficient to cause alignment of ionic materials contained within the seventh stream, thereby producing an eighth stream of water;

flocculating precipitates contained within said eighth stream of water to produce a ninth stream of water; and filtering said ninth stream of water to remove any flocculants and coagulants therefrom.

4. The method of claim 3 comprising the additional step of:

subjecting one of said seventh and ninth streams of water to both ozonation and ultra violet light.

5. The method of treating wastewater for reclamation thereof comprising the steps of:

hydrocyclone filtering contaminated influent water to produce an overflow first stream of water and an underflow second stream of water;

bag filtering the underflow second stream to remove solids while outputting the remaining liquor as a third stream of water;

adjusting the pH of the combination of said first and third streams of water while aerating same with air from bottom to top of a staging tank;

skimming any floc from the surface water of the tank while simultaneously draining water from the bottom of the staging tank to produce a fourth stream of water which as a result of the pH adjustment and aeration may include first further precipitates;

belt filtering the fourth stream of water to remove any said first further precipitates and outputting a fifth stream of water;

ozonating said fifth stream of water before inserting same in a closed container for a period of time sufficient to kill living organisms and precipitate second further solids, the closed container providing ozone as an outgassing output from the incoming fifth stream of water for continuous ozonation of the water in said closed container and providing a sixth stream of water as a further output;

belt filtering the sixth stream of water to remove any second further precipitates and outputting a seventh stream of water;

ozonating and treating said seventh stream of water with ultra violet light;

conducting the seventh stream of water through a magnetic field having a field intensity sufficient to cause alignment of ionic materials contained within the seventh stream, thereby producing an eighth stream of water;

conducting electrical current from sacrificial electrodes through the eighth stream of water to produce at least one of coagulant and flocculants thereby yielding a ninth stream of water; and filtering the ninth stream of water to remove said at least one of coagulant and flocculants thereby yielding a liquid output with contaminants removed.

6. The method of claim 5 where filtering said ninth stream comprises the steps of:

passing said ninth stream of water through a diffuser and magnetic metal recovery trap to a flocculation settling tank;

belt filtering fluid and sludge output from said flocculation settling tank and outputting a tenth stream of water; and filtering said tenth stream of water using at least one of the steps of sand filtering, charcoal filtering and biologically activated charcoal filtering.

7. The method of treating an aqueous solution for reclamation of a portion thereof comprising the steps of:

hydrocyclone filtering an influent aqueous solution to produce an overflow first stream of aqueous solution and an underflow second stream of aqueous solution;

bag filtering the underflow second stream to remove solids therefrom while outputting the remaining liquor as a third stream of aqueous solution;

combining the first and third streams;

adjusting the pH of the combination of said first and third streams of aqueous solution while aerating same within a staging tank;

skimming any accumulated floc from the liquid surface within the staging tank while simultaneously draining liquor from the bottom of the tank to produce a fourth stream of aqueous solution which as a result of the pH adjustment and aeration may include first further precipitates;

belt filtering the fourth stream of water to remove any further solids and outputting a fifth stream of aqueous solution;

ozonating said fifth stream of aqueous solution;

discharging the ozonated fifth stream into a closed container and holding the ozonated liquid for a period of time sufficient to kill living organisms and precipitate further solids, thereby yielding a sixth stream of aqueous solution as a further output;

belt filtering the sixth stream of water to remove any second further precipitates and outputting a seventh stream of aqueous solution;

ozonating said seventh stream of aqueous solution;

treating said seventh stream of aqueous solution with ultra violet light;

conducting the seventh stream of water through a magnetic field having a field intensity sufficient to cause alignment of ionic materials contained within the seventh stream, thereby producing an eighth stream of water; and, filtering of aqueous solution.

8. The method of claim 7 comprising the additional step of:

passing said seventh stream of aqueous solution between electrically charged anode and cathode surfaces to cause coagulation of contaminants therein.

9. The method of treating contaminated water comprising the steps of:

analyzing a sample of contaminated water to be treated to determine the nature of impurities that are contained therein;

centrifugally separating influent contaminated water to be treated into a sludge laden first stream and a partially decontaminated second stream;

mechanically bag filtering the first stream to form a filtrate third stream of water;

combining the second and third streams to produce a fourth stream of water;

adjusting the pH of the fourth stream;

filtering the pH adjusted fourth stream of water to produce a fifth stream of water;

ozonating said fifth stream of water;

precipitating contaminants contained within the fifth stream of water;

filtering precipitates from the fifth stream of water to produce a sixth stream of water; and treating the sixth stream of water to further ozone and ultra violet light.

10. The method of claim 9 comprising the additional steps of:

outputting a stream of ozone rich off gas from the ozonated fifth stream of water as a first stream of off gas; and continuously recirculating the ozonated fifth stream of water while fortifying the same using the first stream of off gas.

11. The method of claim 9 comprising the additional steps of:

conducting the sixth stream of water through a magnetic field having a field intensity sufficient to cause alignment of ionic materials contained within the sixth stream, thereby producing an seventh stream of water;

subjecting said seventh stream of water to a DC voltage between anode and cathode elements at least one of which is sacrificial to produce an eighth stream of water containing flocculation solids; and mechanically filtering said eighth stream of water to remove the flocculation solids and produce a ninth stream of water.

12. The method of treating wastewater for reclamation thereof comprising the steps of:

filtering contaminated influent water to remove solid particles and to produce a first stream of water;

adjusting the pH of the first stream of water while aerating same with air within a staging tank;

skimming floc from the surface water of the tank while simultaneously draining water from the bottom of the staging tank to produce a second stream of water which as a result of the pH adjustment and aeration may include first further precipitates;

filtering the second stream of water to remove any said first further precipitates and outputting a third stream of water;

ozonating said third stream of water;

filtering the ozonated stream of water to remove any said second further precipitates and outputting a fourth stream of water;

ozonating and treating said fourth stream of water with ultra violet light;

conducting the fourth stream of water through a magnetic field having a field intensity sufficient to cause alignment of ionic materials contained within the fourth stream, thereby producing a fifth stream of water;

subjecting the fifth stream of water, after magnetically aligning same, to an electrical current from sacrificial electrodes to produce a sixth stream of water containing at least one of coagulants and flocculants; and filtering the sixth stream of water to produce a liquid output with at least one of coagulants and flocculants removed.

13. The method of treating contaminated water comprising the steps of:

analyzing a sample of contaminated water to be treated to determine the type of impurities that are contained therein;

separating solids from influent contaminated water and outputting the remaining liquor as a first stream;

adjusting the pH of said first stream to induce precipitation of solids in the first stream of water;

filtering the pH adjusted first stream of water to remove solid precipitates thereb yielding a second stream of water;

ozonating said second stream of water to maintain a given level of ozone therein for a time sufficient to precipitate any contaminants so affected by ozonation of the pH adjusted stream of water before outputting a third stream of water;

filtering said third stream of water to remove solids induced by the step of ozonating thereby yielding a fourth stream of water; and subjecting the fourth stream of water to a combination of ozone and ultra violet light for reducing contaminants therein.

14. The method of claim 13 comprising the additional step of:

subjecting the fluid being ozonated to ultrasound for assisting the reaction process of contaminant removal.

* * * * *